United States Patent [19]
Smith, Jr.

[11] 3,971,544
[45] July 27, 1976

[54] APPARATUS FOR GUIDING A ROD INTO A CONDUIT

[75] Inventor: Raymond W. Smith, Jr., Texarkana, Ark.

[73] Assignee: Rockwell International Corporation, Pittsburgh

[22] Filed: Nov. 5, 1975

[21] Appl. No.: 628,868

[52] U.S. Cl. ................ 254/134.3 FT; 15/104.35 N
[51] Int. Cl.² ......................................... H02G 1/00
[58] Field of Search ............ 254/134.3 R, 134.3 FT; 15/104.35 N; 242/54 R

[56] References Cited
UNITED STATES PATENTS

| | | | |
|---|---|---|---|
| 2,663,515 | 12/1953 | Kinsinger | 254/134.3 R |
| 3,601,365 | 4/1969 | Hall | 254/134.3 FT |
| 3,887,163 | 6/1975 | Prange | 254/134.3 FT |
| 3,912,225 | 10/1975 | Earnheart | 254/134.3 R |

*Primary Examiner*—Al Lawrence Smith
*Assistant Examiner*—Robert C. Watson

[57] ABSTRACT

Apparatus for guiding a rod into a conduit from a reel located remote from the conduit is comprised of an elongated support one end of which is mounted adjacent the end of the rod when fully wound on the reel. The other end of the support is adapted to receive and support a guide conduit extending between the support and the conduit into which the rod is to be inserted. A cover extending substantially the length of the support is removably mounted thereon whereby the support and cover provide an extension of the guide conduit to guide the end of the rod into the guide conduit when the rod is unwound from the reel.

16 Claims, 5 Drawing Figures

APPARATUS FOR GUIDING A ROD INTO A CONDUIT

BACKGROUND OF THE INVENTION

The invention herein relates to apparatus for guiding cable or rod into a conduit, for example, conduit into which a telephone cable is to be inserted. In practice a supply of telephone cable or the like is located at a manhole and the equipment for pulling the cable through the conduit is located at a remote manhole, the conduit through which the cable is to be pulled extending between the two manholes. The cable pulling apparatus is comprised of a length of rod wound on a reel with means for feeding the rod into the conduit until the end of the rod emerges from the conduit at the manhole where the supply of telephone cable, also usually wound on reels, is located. The end of the telephone cable is secured to the end of the rod and the rod is retrieved by the apparatus at the remote manhole to pull the telephone cable through the conduit. Apparatus for feeding the rod into the conduit and retrieving it is described in detail in U.S. Pat. No. 3,887,163 to Prange, dated June 3, 1975.

Preferably the rod feeding and retrieving apparatus will be permanently mounted on a vehicle for ease of transport from site to site although this may not always be the case. In any event it is not always possible to locate the vehicle or the rod feeding and retrieving equipment close to end of the telephone cable conduit into which the rod is to be fed in which case a flexible guide conduit is used which extends between the end of the telephone cable conduit and the rod feeding and retrieving equipment, to guide the end of the rod in its transit between the equipment and the telephone cable conduit. Conventionally, this guide conduit is made of flexible material to permit any bends which may be necessary between the feeding and retrieving equipment and the telephone cable conduit.

A problem arises, however, in that the end of the guide conduit near the rod feeding and retrieving equipment must be mounted in some fixed relationship with respect thereto. Conventionally, in prior art equipment it is mounted at the point where the end of the rod emerges from the rod feeding equipment. This is not satisfactory, however, since it is desirable that provision be made for securing and replacing a mandrel or guide tool to the end of the rod to facilitate its passage through the conduit. These tools are of significant lengths and are frequently removed and replaced so it is desirable that some considerable distance be left between the end of the rod where it emerges from the rod feeding equipment and the end of the guide conduit. Also when the telephone cable is pulled through the conduit, space must be provided to disconnect the cable from the end of the guide tool or rod.

SUMMARY AND OBJECTS OF THE INVENTION

The present invention solves these problems by providing an elongated support extending from the point where the end of the rod emerges from the feeding equipment and which is adapted to support one end of the guide conduit at the end of the support which is remote from the rod feeding equipment. Since the rod is relatively flexible, to prevent buckling of the rod between the end of the guide conduit and the rod feeding equipment while rod is being fed into the conduit, the support is provided with a removable cover, which when placed on the support, together with the support, provides in effect, an extension of the guide conduit which terminates close to the point where the rod emerges from the rod feeding equipment. When it is desired to remove or replace the mandrel or disconnect the telephone cable, the cover is removed to expose the rod or the end of the cable to facilitate work thereon.

Accordingly, it is a primary object of this invention to provide an elongated support extending between the rod feeding equipment and the end of the guide conduit into which the rod is to be fed.

It is another object of the invention to provide a support extending from the rod feeding equipment and which is adapted to support the end of the guide conduit in spaced relationship from the rod feeding equipment.

It is a further object of the invention to provide a support according to the preceding object together with a removable cover for the support which is substantially coextensive with the length of the support to provide a rod guide extending between the rod feeding equipment and the end of the guide conduit.

A still further object of the present invention is to provide a support extending from the rod feeding equipment, the position of which can be adjusted about each of two angularly displaced axes.

DESCRIPTION OF THE PREFERRED EMBODIMENT

Figure 1:
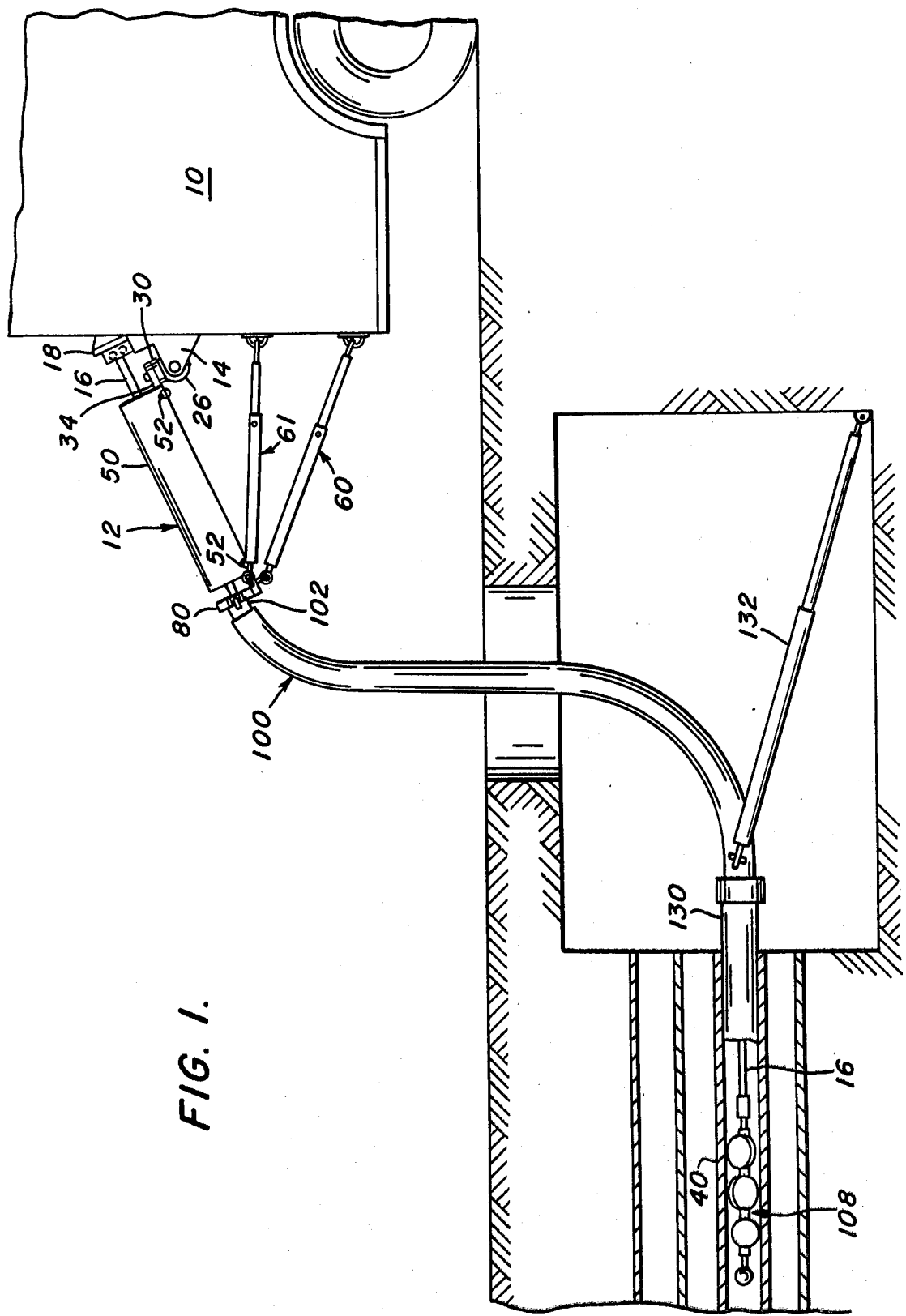
FIG. 1 shows the invention herein mounted from the rear of a truck and in operative relationship with respect to a manhole.
Figure 2:
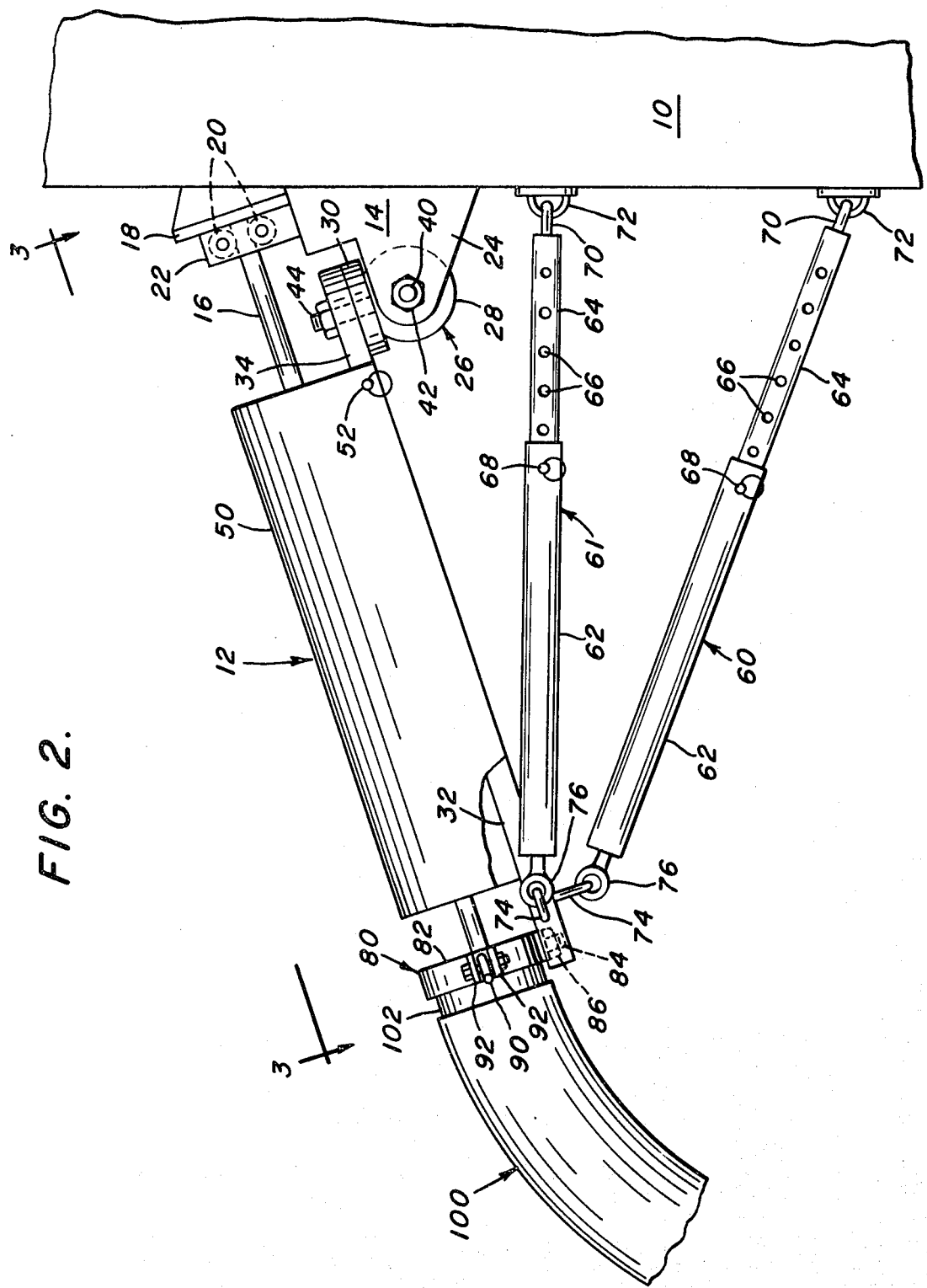
FIG. 2 shows a close-up side view of the invention herein.
Figure 3:
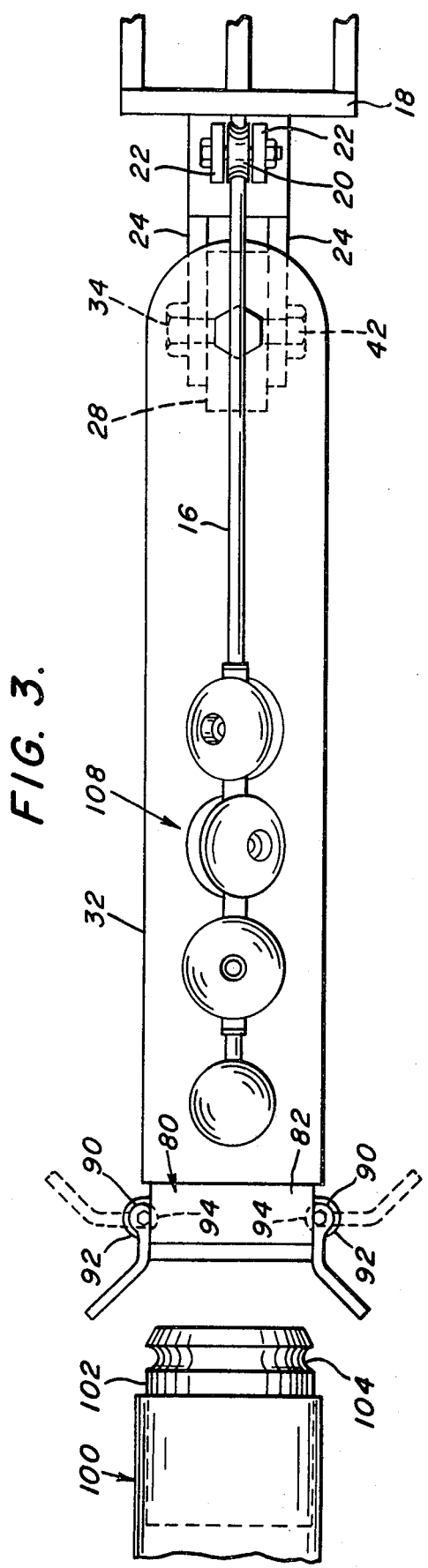
FIG. 3 is a view of the invention herein with the cover removed viewed in the direction of the arrows 3—3 of FIG. 2.

As shown in FIGS. 1–3 an extension support indicated generally by the numeral 12 is mounted on the rear of a vehicle 10 which carries within its interior a rod feeding and retrieving apparatus of the type described in detail in U.S. Pat. No. 3,887,163. A mounting bracket 14 having two laterally spaced rearwardly projecting ears 24 is rigidly secured to the rear of the truck just below the point where the rod 16 emerges from the interior of the truck. Two parallel roller mounting plates 22 are rigidly secured to a bracket 18 which is also secured to the rear of the truck at the point where the rod emerges from the interior thereof. Rollers 20 are rotatably mounted between plates 22 and are adapted to guide the rod 16 therebetween as the rod is fed from the rod feeding equipment within the truck. A pivot member 26 is comprised of a generally circular portion 28 and a circular portion 30 which is formed on or secured to portion 28 in such a manner that the intersection between the portions 28 and 30 defines a chord of the circular portion 28 as best shown in FIG. 2.

The extension support 12 is comprised of an elongated table 32 the cross section of which may be in the form of a channel having a top wall and side walls depending therefrom. A circular ear portion 34 of generally the same configuration as portion 30 of pivot bracket 26 is rigidly secured, as by welding, to the forward end of table 32. Pivot bracket 26 is pivotally mounted on bracket 14 for pivotal motion about a horizontal axis by means of a pin 40 which extends through both ear portions 24 and is secured thereto by means of nuts 42. A partially threaded stud 44 extends through an opening in ear portion 34 of table 32 and is threaded into portion 30 of pivot bracket 26 to thereby mount table 32 on bracket 26 for pivotal movement about the axis of stud 44. Thus the table 32 is mounted for pivotal motion with respect to the truck about the axis of pin 40 and about the axis of stud 44 which axes are normal to each other.

A generally U-shaped cover 50 is removably secured to the table 32 by means of two pins 52 which extend through the lower wall portions of the cover 50 at either end thereof and through the side walls of the table 32. By removing the pins 52 the cover 50 may be removed for the purpose of replacing guide mandrels or tools or detaching the telephone cable from the end of rod 16.

Struts 60 and 61 are comprised of outer sleeves 62 into which are telescoped inner members 64 which are provided with longitudinally spaced openings 66. The length of the assembly comprised of sleeve members 62 and inner members 64 may be adjusted by positioning the inner member in any selected position within the sleeve 62 so that the desired one of openings 66 coincides with a similar opening in sleeve member 62 through which a pin 68 is inserted to secure the inner member 64 in the selected position. Eye pieces 70 are rigidly secured to and project from the end of inner members 64. Eye pieces 70 are loosely received on half grommets 72 which in turn are rigidly secured to the rear of truck 10 so that the forward ends of struts 60 and 61 are pivotally mounted on the rear of truck 10 for universal movement with respect thereto. The rear ends of the struts 60 and 61 are similarly secured to the rear portion of table 32 by the inter-engagement of eye pieces 74 rigidly secured to the rear portion of table 32 and eye pieces 76 which are rigidly secured to and project from the rear end of sleeves 62. Thus the rear ends of the struts 60 and 61 are secured to the rear end of the table 32 for universal movement with respect thereto. It can readily be seen that by adjusting the length of the strut assemblies 60 and 61 the extension support 12 can be positioned with respect to truck 10 at any desired angle of inclination about pin 40 and at any rotated position about pin 44.

A coupler 80 is comprised of an annular ring portion 82 from which projects a threaded stud 84 which projects through an opening near the rear of the top wall of table 32 and is secured thereto by means of a nut 86. The diameter of the ring portion 82 is of the same general dimension as the space enclosed by the cover 50 and is generally aligned therewith. As best shown in FIGS. 2 and 3 locking cams 90 are pivotally mounted between pairs of ears 92 secured to diametrically opposed portions of the exterior of ring portion 82. Suitable openings are provided in the wall of ring portion 82 contiguous to the cams 90 so that when cams 90 are rotated from the position shown in FIG. 3 a portion of the cams will project through the wall of ring portion 82 and into the space enclosed by ring portion 82 to the position shown by dotted lines 94. A relatively flexible guide conduit indicated generally by the numeral 100 has a mounting adaptor 102 tightly fitted into the end thereof to be mounted on the extension support 12. The adaptor 102 has a portion which projects from the end of the guide conduit 100 and on which is formed an annular groove 104. In order to mount the end of the guide conduit 100 on the extension support, adaptor 102 is inserted into the ring portion 82 with the cams 90 in the solid line position shown in FIG. 3. The cams are then rotated to extend to the position shown in dotted lines 94 in FIG. 3 in which position they project into annular groove 104 to firmly and rigidly mount adaptor 102 and that end of the conduit 100 on the end of the extension support 12.

Figure 4:
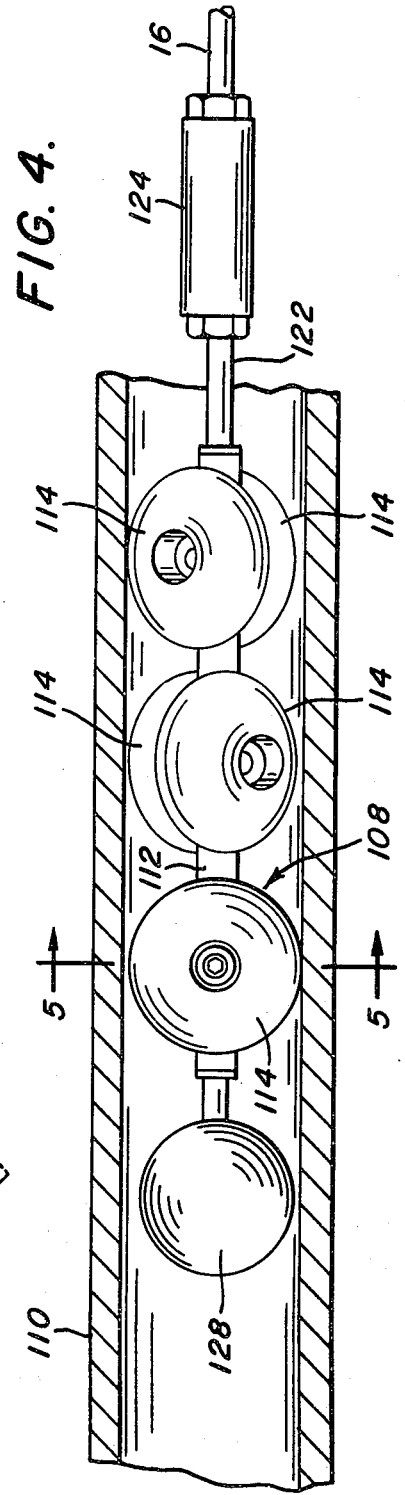
FIG. 4 is a drawing showing a novel guide mandrel assembly for use in connection with the invention herein.
Figure 5:
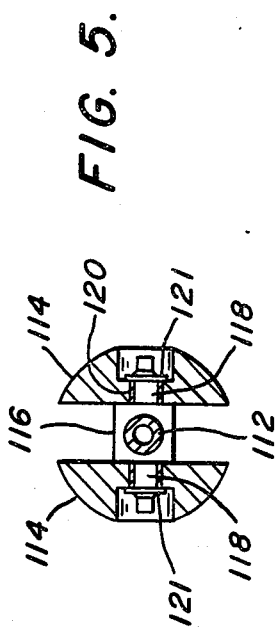
FIG. 5 is a view taken along line 5—5 of FIG. 4.

Referring now to FIGS. 4 and 5, shown there are the details of a novel mandrel assembly 108 which is connected to the end of the rod 16 to guide it in its passage through a typical underground conduit 110. The mandrel is comprised of an elongated cylindrical sleeve 112 which has rotatably mounted thereon a series of pairs of spherical segmental-shaped rollers 114. As best shown in FIG. 5, for each pair of rollers, a boss 116 having laterally projecting diametrically opposed stub shafts 118, is fixed as by welding to sleeve member 112. Each stub shaft 118 has mounted thereon the bushings 120 on which rollers 114 are journalled. Retainers 121 retain rollers 114 on stub shafts 118. The axis of rotation of each of the pairs of rollers 114 are angularly displaced with respect to each other about the axis of sleeve 112 so that the spaces between the rollers of each pair of rollers are not aligned with the spaces between the rollers of any of the other pairs of rollers. A shaft 122 is rotatably received within the sleeve member 112 and is approximately the same diameter as the rod 116 which is fed from the rod feeding equipment within the vehicle 10. Shaft 122 is connected to rod 16 for rotation therewith by means of a coupler 124 the construction of which is well known in the art. A sphere 128 is fixedly secured to the leading end of shaft 122, the diameter of the sphere preferably being less than the diameter of the segments 114.

When it is desired to insert a length of rod into a conduit the truck 10 containing the rod feeding equipment is located as close as possible to the manhole and the underground vault communicating with the conduit into which the rod is desired to be inserted. As shown in FIG. 1 the truck 10 is positioned relatively close to the manhole. It should be understood, however, that in some locations it may not be possible to locate the truck close to the means of access to the conduit and it is frequently necessary that the guide conduit 100 be of substantial length. Also in its passage between the truck and the conduit it may have several bends in it in order to guide the rod around obstacles between the truck and the conduit into which the rod is to be inserted.

Normally, the end of the rod 16 protrudes a short distance from the rollers 20. After the truck has been positioned as close as possible to the manhole the struts 60 and 61 will be adjusted to give the extension support 12 the desired angle of inclination about the axis of pin 40 and the desired rotated angular position about the axis of bolt 44 to best accommodate the orientation of the truck with respect to the manhole. The cover 50 will then be removed by removing pins 52 to expose the top of table 32 to the individuals operating the equipment. A mandrel such as that as hereinabove described may be easily connected to the end of rod 16. One end of the guide conduit 100 is secured to the extension support by inserting adaptor 102 into ring portion 82 of coupler 80 and the cam portions 90 are then rotated to the position shown by dotted line 94 to protrude into groove 104 on adaptor 102 to securely mount the adaptor and the end of guide conduit 100 the rear end of the extension support. The guide conduit 100 is then laid along the most convenient path to the manhole and into the vault. The other end of the guide conduit 100 is secured to a duct connector 130 which in turn is inserted into the conduit 110 into which the rod is to be inserted. One end of two adjustable braces 132 (only one of which is shown) is pivotally secured to the end of conduit 100 or the duct connector 130 and extends to the opposite wall of the vault to act as braces to hold the conduit 110 and duct connector 130 in place with respect to conduit 110.

The cover 50 is now resecured to the table 32 and the rod feeding apparatus within the truck 10 is operated to begin the rod feeding operation. The mandrel and the rod 16 are guided by the cover 50 and the table 32 through the extension support through the ring portion 80 and into the guide conduit 100 and into the conduit 110 into which the rod is to be inserted. The rod feeding operation continues until the mandrel and a portion of the end of rod 16 emerges from the remote end of conduit 110. The mandrel may then be removed and the end of the telephone cable secured to the end of rod 16 by any one of several coupling means well known in the art. The telephone cable may then be pulled through the conduit 112 by reversing the operation of the rod feeding and retrieving apparatus in the interior of truck 10 until the end of the telephone cable emerges from the guide conduit 100 at the extension support 12. The cover 50 is then removed and the rod 16 detached from the cable.

The rod feeding apparatus contained in the truck 10 as described in U.S. Pat. No. 3,887,163 imparts a rotational motion to the rod 16 about its axis as well as a longitudinal feeding force. Thus as the rod 16 is forced through the conduit 110, it is guided by the spherical segment-shaped rollers 114. As explained above the axis of rotation of each pair of rollers is angularly displaced from the axis of rotation of the other pair of rollers so that none of the spaces between any of the pair of rollers will be aligned with the spaces between the other pairs of rollers. By this means the rod 16 is firmly supported in all directions and guided in the conduit 110. In its passage through the conduit 110 the rod may be subjected to lateral and even vertical thrusts. By angularly displacing the axis of rotation of each of the pairs of rollers 114 the rod is assured of a firm support on the interior wall of the conduit 110 regardless of what side or radial thrusts the rod may be subjected to. Since the rod 122 is rotatably mounted in the sleeve 112, rod 16 is free to rotate with respect to the mandrel. The sphere 128 prevents the end of the mandrel from getting caught in or digging into obstructions which may be encountered in the conduit 110, the rounded shape of the sphere 128 facilitating the passage of the mandrel past obstacles on which a free relatively sharp end of the mandrel might otherwise get caught.

It must be appreciated that during the rod feed operation that any free unguided length of rod 16 would tend to buckle or bend under the pressure of the feeding apparatus. The guide conduit 100 provides the means to support and guide the rod and to prevent its buckling between the conduit 110 and the point where the rod emerges from the truck. If the conduit 110 were attached directly to the rear of the truck right at the point where the rod 16 emerges from the feeding equipment, in order to attach or replace mandrels or to disconnect the telephone cable when it has been pulled through the conduit it would be necessary to disconnect the guide conduit 100 from the truck in order to give access to the end of the rod 16. The extension support 112 therefore provides a means to perform these operations when the cover 50 is removed and when the cover 50 is replaced the extension support 112 then, in effect, acts as an extension of guide conduit 100 to prevent buckling of the rod 16 as it traverses the space between the end of guide conduit 100 and the rollers 20.

The strut 61 may be adjusted to position the extension support 112 to any desired position with respect to the truck 10. When the operation is completed the pins 68 may be removed from the struts 60 and 61 and the extension support rotated to a position where its length extends laterally along and closely adjacent to the rear of truck 10 where it may be held in position by any convenient means such as a strap, not shown. Before being placed in this position, of course, it is necessary to retrieve the rod 16 sufficiently so that the free end thereof is clear of the end of the extension support 12 which is adjacent to the rear of truck 10.

I claim:

1. Apparatus for inserting rod into a conduit comprising, a length of rod wound on a reel spaced from said conduit, an elongated support one end of which is positioned adajcent the end of said rod when wound on said reel, a guide conduit extending between the other end of said support and the conduit into which said rod is to be inserted, removable cover means on said support extending substantially the length of said support whereby said support and said cover provide conduit means to guide the end of said rod into said guide conduit when said rod is unwound from said reel.

2. Apparatus defined in claim 1 in which said one end of said support is mounted to permit pivotal movement of said support in a first plane.

3. Apparatus defined in claim 1 in which said one end of said support is mounted to permit pivotal movement of said support in a first plane and in a second plane normal to said first plane.

4. Apparatus defined in claim 1, together with cooperating means on one end of said guide conduit and said other end of said support to secure said one end of said guide conduit to said other end of said support.

5. Apparatus defined in claim 2 together with means to adjust said support to a selected position in said first plane.

6. Apparatus defined in claim 3 together with means to adjust said support member to a selected position in both said first plane and said second plane.

7. Apparatus for inserting rod into a conduit from a reel mounted on a vehicle comprising a support, mounting means to mount one end of said support on said vehicle adjacent said reel, a guide conduit extending between the other end of said support and the conduit into which said rod is to be inserted, removable cover means on said support extending substantially the length of said support, said cover and said support providing conduit means to guide the end of said rod into said guide conduit when said rod is unwound from said reel.

8. Apparatus defined in claim 7 in which said mounting means is adapted to permit pivotal movement of said support in a first plane.

9. Apparatus defined in claim 7 in which said mounting means is adapted to permit pivotal movement of said support in a first plane and in a second plane normal to said first plane.

10. A support adapted to be mounted on a vehicle which carries a supply of rod normally wound on a reel and adapted to be inserted into a conduit comprising, an elongated support member, mounting means to mount one end of said support member on said vehicle adjacent the end of said rod when fully wound on said reel, means associated with the opposite end of said support member adapted to receive and support the end of a guide conduit, and removable cover means on said support member extending substantially the length thereof and adapted to form therewith an extension of said guide conduit.

11. Apparatus defined in claim 10 in which said mounting means is adapted to permit pivotal movement of said support member in a first plane.

12. Apparatus defined in claim 10 in which said mounting means is adapted to permit pivotal movement of said support member in both a first plane and a second plane normal to said first plane.

13. Apparatus defined in claim 11 together with means to secure said support member in a selected pivotal position in said first plane.

14. Apparatus defined in claim 12 together with means to secure said support member in a selected pivotal position in both said first plane and said second plane.

15. Apparatus defined in claim 14 in which said last mentioned means is comprised of at least two support struts one end of each of which is pivotally secured to said support member near said opposite end thereof, the other ends of said struts being pivotally attached to said vehicle, and said struts diverging away from each other from said opposite end of said support member toward said vehicle.

16. Apparatus defined in claim 15 in which the length of each of said struts is independently adjustable.

* * * * *